June 3, 1924.
E. B. SHERMAN
ATTACHMENT FOR HULLER COTTON GINS
Filed July 19, 1923
1,496,385
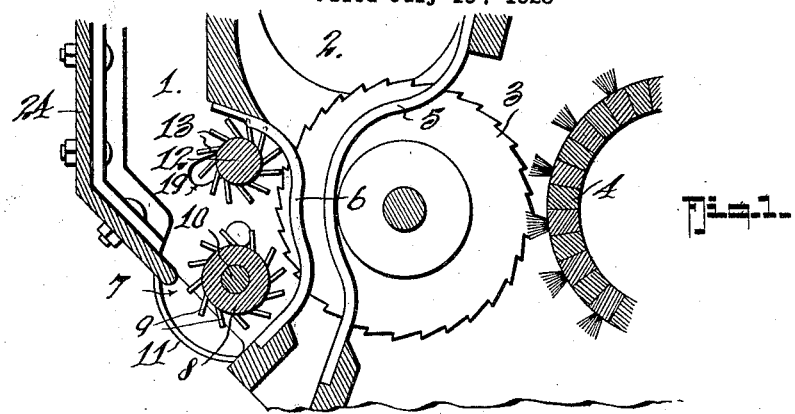
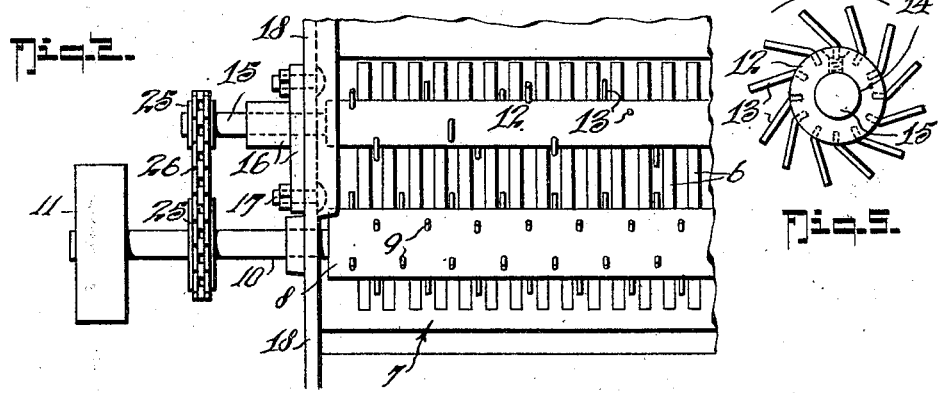
INVENTOR
Eldridge B. Sherman.
BY
Albert E. Dieterich
ATTORNEY Patented June 3, 1924.

1,496,385

UNITED STATES PATENT OFFICE.

ELDRIDGE B. SHERMAN, OF BARTLETT, TEXAS, ASSIGNOR TO EDWIN C. SONNTAG, OF BARTLETT, TEXAS.

ATTACHMENT FOR HULLER COTTON GINS.

Application filed July 19, 1923. Serial No. 652,644.

*To all whom it may concern:*

Be it known that I, ELDRIDGE B. SHERMAN, a citizen of the United States, residing at Bartlett, in the county of Williamson and State of Texas, have invented certain new and useful Improvements in Attachments for Huller Cotton Gins, of which the following is a specification.

The invention relates to certain new and useful improvements in cotton gins of the type disclosed in by Patent No. 1,446,021, issued under date of February 20, 1923.

The usual construction of huller gin has the regular gin saws in connection with the ginning ribs and roll box. Before entering the roll box the cotton must be drawn through what are known as the huller ribs, at the base of which is located the picker roll. The picker roll is adapted to agitate and throw the seed cotton against the huller ribs and the saws pull the cotton through the ribs into the roll box.

In the above mentioned operation there is a tendency to work the seed cotton and trash to the tops or forks of the huller ribs, causing the spaces between the ribs to become clogged, thus retarding the cotton from passing through the ribs. Due to this fault it is necessary to frequently clear the spaces between the ribs, manually; also, great danger is occasioned in that the saws, passing speedily through the massed and wadded cotton and trash, cause great friction, often sufficient to ignite the cotton with disastrous results. In addition, the saws are prematurely dulled and the cotton damaged by reason of the saws cutting and tearing the fibres thereof.

The disclosure of my patent referred to was designed to overcome the objections and faults stated by providing a roller attachment studded with pins set in spiral form around the same and being positioned to pass between the huller ribs to effect the desired clearing thereof.

Huller gins equipped with attachments disclosed in the patent referred to were a great advance in the art but are not without their disadvantages. It was found that while perfectly effective when perfect seed cotton was being run the peculiar type of attachment roller was not practical for use when the ginning season had advanced and whole cotton burrs or bolls were mixed with the cotton, when the roller pin arrangement would effect a crushing and matting of the cotton and trash between the ribs and saw points and the passing thereof into the roll box.

Therefore it is the general object of my present invention to provide an improved construction of attachment roller having the pins thereof peculiarly arranged, and otherwise constructed, for cooperating with the huller gin parts in a manner for overcoming all of the above noted objections, being movably mounted to facilitate perfect cooperation with said parts, and being also constructed in a manner facilitating its ready and convenient removal.

With the above and other objects in view, the invention further resides in those novel details of construction, combination and arrangement of parts, all of which will be first fully described, then be particularly pointed out in the appended claims reference being had to the accompanying drawing, in which :—

Figure 1 is a central vertical cross section showing my invention operatively mounted in cooperative relation with parts of a huller cotton gin.

Figure 2 is a front elevation of the parts shown in Figure 1, the front cover plate being removed.

Figure 3 is an end elevation showing a portion of the gin breast plate and one of the adjustable end bearings whereby my roller attachment is mounted upon the same in cooperative relation with the associated parts of the gin.

Figure 4 is a detail cross section taken on the line 4—4 on Figure 3.

Figure 5 is an end elevation of the attachment roller, and

Figure 6 is a diagrammatic development of a portion of the attachment roller surface showing the positioning of the pins.

In the drawing in which like numerals of reference indicate like parts in all of the figures, 1 represents the inlet to the huller gin, 2 the roll box, 3 the saws, 4 the brush for removing lint from the saws, 5 the seed ribs, and 6 the huller ribs which are all of well known construction and arrangement. The usual discharge opening is indicated at 7 wherein is arranged the picker roll 8, provided with the usual teeth or pins 9, see Figures 1 and 2 of the drawing.

The shaft 10 of the roll 8 projects through one of the end or breast plates and is provided with a drive pulley 11 whereby rotary motion may be imparted to the said roll by power transmission from a suitable source.

All of the foregoing constitute disclosures heretofore known in this art and further description of these well known parts is deemed unnecessary. The following description is directed to the features of my present invention which constitutes an improvement over the disclosures of my Patent No. 1,446,021 and by the application of which a huller cotton gin is made universally practical.

As in my patent referred to, my present improved attachment roller 12 is positioned transversely of the machine between picker roll 8 and roll box 2 and in the inlet throat 1, in front of the saws 3 and adjacent the upper portions of the huller ribs 6, so that, when the said roller is revolved, the teeth or fingers 13 thereof will be in cooperative relation with the spaces between said huller ribs.

The roller 12 is equipped with end trunnions 15 adapted to have end bearing in the movable bearing members 16 pivoted at 17 to the end or breast plates 18 of the gin. The end plates are also each provided with an arcuate slot 19, to accommodate adjustment movement of the trunnions 15, and a single aperture 20 for accommodating the securing bolt and nut connections 21 which pass therethrough and through the selected one of the plurality of adjustment apertures 22 provided in each pivoted bearing member 16. Thus an adjustment of the position of the attachment roller 12 toward or from the huller finger portions is made possible for a purpose later to be described. See Figures 3 and 4.

The trunnions 15 may be removably mounted in sockets provided therefor in the roller 12 and secured to position therein by the set screws 23, see Figure 4.

This feature makes it possible to readily remove the attachment roller 12 by merely loosening the set screws 23 and retracting the trunnion members 15 through their bearings, without removing the end plates 18, which would of course affect the other mechanisms carried thereby, and without disturbing the desired adjustment of the said roller, it being understood of course that the front plate 24 of the machine has first been removed.

The attachment roller may be driven from the picker roll shaft 10, the latter, and one of the trunnions 15, which is extended, being provided with sprockets 25, over which takes the transmission chain 26.

As is well known to those familiar with the use of huller cotton gins, the purpose of the picker roll 8 is to throw the cotton up against the saws 3. The said picker roll and saws are caused to rotate in like direction but because of their relative positions the adjacent portions of their peripheries will, of course, be passing in opposite directions. It has been found that these parts, unaided, often effect a faulty condition in that the cotton is sometimes thrown too high by the saws, causing clogging and imperfect functioning.

By providing an attachment roller mounted to rotate in like direction with that of the picker roller, from which it is driven, such as is illustrated in my patent referred to, the fault above mentioned is overcome under ideal running conditions, but not under conditions less favorable. It was the purpose of this roller to act upon the cotton with a combing-like action for keeping it down near the saws where the saws could better grip the same and carry it into the roll box, the fingers thereof simultaneously tending to keep the spaces between the ribs from clogging with trash or wadded cotton.

In practical use of the above mentioned structure it was found that along in the ginning season, when a good many parts of the cotton burrs were mixed with the seed cotton, this continuous close spiral or comb like formation was ineffective in that it effected a holding of the burrs against the saws and ribs, causing a great deal of trash to be forced through the ribs into the roll box.

This defect caused a great deal of trouble in the season mentioned and much time and labor was expended in endeavoring to discover and overcome the faults of construction causing the defect.

This experimenting resulted in the devising of the particular perfected type of attachment roller forming a particular feature of this invention. This improved structure discloses a dodged arrangement of the pins or teeth 13 whereby the difficulties referred to have been effectively eliminated.

The dodged relation and special construction of my improved roller, disclosed in detail in Figures 5, 6 and 7, overcomes the fault of the continuous pressure applied by the close positioned continuous spiral arrangement of my former structure in providing spaces permitting the trash, where there is an abundance thereof, to drop back as the roller is revolved, without being forced through the rib spaces into the roll box.

In the new construction of attachment roller the same number of teeth or pins 13 are provided and they are mounted upon the roller in tangential relation to the periphery thereof just as in the patented roller mentioned, the great difference being in that the said pins are not in closely adjacent continuous relation, each one thereof acting in cooperation with its adjacent rib space and entirely independent of the remainder of the teeth of the roller, thus effectively preventing forcing of the trash or bolls through the said space by permitting them to fall back as the roller is rotated. The mounting of the attachment roller in adjustable bearings, as herein described in detail, is of great advantage in that it makes it possible to adjust the distance between the face of the attachment roller and the adjacent faces of the huller ribs. This feature of the invention is particularly advantageous when the ginning season has advanced somewhat, at which time the whole cotton burr or boll is pulled or comes off of the stalk in the picking of the cotton, thus rendering difficult perfect operation of similar machines heretofore constructed and used, including the structure disclosed in my previous patent. The open burrs are usually two inches or more in dimension from point to point and when a great many of such burrs are mixed with the seed cotton, the attachment roller, if fixedly mounted to a permanent adjustment, in revolving would cause the pins thereof to pass between the huller ribs just clearing the saw teeth and result in the crushing of the burrs and bolls between the ribs and saw points and thus effect a passing of the trash into the roll box.

By providing the adjustable mounting for my roller the same may be adjusted in its relation to the adjacent faces of the huller ribs, the distance being governed by the amount of burrs, stalk parts, leaves, bolls or other trash matter, and thus preventing the forcing of the trash through the spaces of said ribs but still permitting the desired functioning of the said attachment roller. The same result of keeping the cotton down where the saw can grip it and the keeping of the ribs clear of wadded cotton or trash by action of the pins 13 sweeping the face of the ribs with the sharp burrs and trash and the space between the points of saws and the pins of the attachment rollers being enlarged, the trash is thrown back against the pins of the picker roller and carried out at the bottom of the inlet of the gin, see Figure 1 of the drawing.

From the foregoing description, taken in connection with the accompanying drawing, it is thought that the novel details of construction, the manner of operation and the advantages of my invention will be readily apparent to those skilled in the art to which it relates.

What I claim is:

1. In a huller cotton gin, in combination with the casing, the roll box, the saws, the huller ribs and picker roll, a revoluble roller having pins set in dodged relation as to position so that the adjacent continuity of relation thereof will be broken and extending tangentially from the periphery of the said roller, said roller being arranged adjacent to the huller ribs and in position for having its pins in cooperative relation with the spaces between the said ribs.

2. In a huller cotton gin, in combination with the casing, the roll box, the saws, the huller ribs and picker roll, a revoluble roller having pins set in dodged relation as to position so that the adjacent continuity of relation thereof will be broken and extending tangentially from the periphery of the said roller, said roller being arranged adjacent to the huller ribs and in position for having its pins in cooperative relation with the spaces between the said ribs, and adjustable bearings for the said roller whereby the closeness of relation thereof with the huller ribs may be varied to suit requirements.

3. In a huller cotton gin, in combination with the casing, the roll box, the saws, the huller ribs and picker roll, a revoluble roller having pins set in dodged relation as to position so that the adjacent continuity of relation thereof will be broken and extending tangentially from the periphery of the said roller, said roller being arranged adjacent to the huller ribs and in position for having its pins in cooperative relation with the spaces between the said ribs, end trunnions adapted to form end bearings for the roller, the sides of said casing having slotways through which the trunnions pass, bearing members movably secured to the casing sides and adapted to receive the trunnions, and means for securing the bearing members to adjusted positions.

4. In a huller cotton gin, in combination with the casing, the roll box, the saws, the huller ribs and picker roll, a revoluble roller having pins set in the same to project tangentially from the periphery thereof and being arranged adjacent to the huller ribs in position for having the said pins cooperate with the spaces between the said ribs, end trunnions for the roller, movable bearings for the trunnions, the said trunnions being removably mounted in the ends of the roller to be readily removable therefrom and into the said bearings to permit ready removal of said roller.

5. In a huller cotton gin, in combination with the casing, the roll box, the saws, the huller ribs and picker roll, a revoluble roller having pins set in dodged relation that the adjacent continuity of relation thereof will be broken and to project tangentially from the periphery of said roller, the said roller being arranged adjacent to the huller ribs in position for having the said pins cooperate with the spaces between the said ribs, end trunnions for the roller, the said casing having slotways through which the trunnions may pass, movable bearing members pivotally secured to the casing sides and adapted to receive the trunnions, the said bearing members each having a plurality of adjustment apertures, the said casing sides each having a single securing aperture, securing means insertable through the said single apertures and the selected ones of the plurality of apertures to secure the adjusted positions of the bearing members, the said trunnions being removably mounted in the ends of the roller to be readily removable therefrom and into the said bearing members to permit ready removal of said roller.

In testimony whereof I have signed my name to this specification.

ELDRIDGE B. SHERMAN